(12) United States Patent
Perez

(10) Patent No.: US 10,280,601 B1
(45) Date of Patent: May 7, 2019

(54) PLUMBING P-TRAP

(71) Applicant: William Perez, Brooklyn, NY (US)

(72) Inventor: William Perez, Brooklyn, NY (US)

( * ) Notice: Subject to any disclaimer, the term of this patent is extended or adjusted under 35 U.S.C. 154(b) by 0 days.

(21) Appl. No.: 15/785,598

(22) Filed: Oct. 17, 2017

(51) Int. Cl.
| | | |
|---|---|---|
| *E03C 1/284* | (2006.01) | |
| *E03C 1/22* | (2006.01) | |
| *B67B 7/18* | (2006.01) | |
| *F16L 55/115* | (2006.01) | |
| *E03C 1/302* | (2006.01) | |
| *E03F 9/00* | (2006.01) | |

(52) U.S. Cl.
CPC .............. *E03C 1/284* (2013.01); *B67B 7/18* (2013.01); *E03C 1/22* (2013.01); *E03C 1/302* (2013.01); *E03F 9/002* (2013.01); *F16L 55/1152* (2013.01)

(58) Field of Classification Search
CPC ........ B08B 2209/04–2209/0556; B08B 9/027; B08B 9/04–9/051; E03C 1/284; E03C 1/302; E03F 9/00–9/005
USPC ......... 138/89; 15/104.062, 104.33; 4/255.01, 4/256.1; 81/125.1, 53.2, 77
See application file for complete search history.

(56) References Cited

U.S. PATENT DOCUMENTS

| | | | | |
|---|---|---|---|---|
| 2,241,560 A | * | 5/1941 | Schouler | F16L 45/00 138/89 |
| 2,451,051 A | * | 10/1948 | Tubbs | E03F 9/002 138/89 |
| 3,168,104 A | | 2/1965 | Mathis | |
| 3,936,892 A | * | 2/1976 | Miller | E03C 1/286 4/255.01 |
| 4,031,914 A | | 6/1977 | Neri | |
| 4,371,991 A | * | 2/1983 | Schrott | E03C 1/30 137/247.51 |
| D295,780 S | | 5/1988 | Thomas | |
| 5,107,550 A | * | 4/1992 | Hawro | E03F 9/005 15/104.33 |
| 5,651,147 A | * | 7/1997 | Steele | E03C 1/122 4/255.01 |
| 5,996,447 A | * | 12/1999 | Bayouth | B25B 13/06 81/121.1 |
| 6,098,212 A | * | 8/2000 | Rogan | E03C 1/306 15/104.33 |
| 6,257,099 B1 | * | 7/2001 | Rosenbaum | B25B 13/48 81/124.4 |
| D531,285 S | | 10/2006 | Williams | |
| 7,531,088 B2 | | 5/2009 | Gurmu | |

(Continued)

FOREIGN PATENT DOCUMENTS

CA          2513673 A1    8/2004

*Primary Examiner* — David P Angwin
*Assistant Examiner* — Nicholas A Ros

(57) ABSTRACT

The improved plumbing P-trap is a plumbing fixture. The improved plumbing P-trap attaches the drain of a sink to a DWV. The improved plumbing P-trap transports gray water into the DWV from the sink. The improved plumbing P-trap comprises a modified P-trap, a second clean out plug, and a snake guide. The modified P-trap transports gray water from the sink drain to the DWV. The second clean out plug is the modification to the modified P-trap that provides access to the DWV side of the modified P-trap. The second clean out plug is intended for use with a plumbing snake. The snake guide: 1) opens the second clean out plug; and, 2) attaches to the second clean out plug to guide the plumbing snake into the DWV.

8 Claims, 5 Drawing Sheets

(56) References Cited

U.S. PATENT DOCUMENTS

| | | | |
|---|---|---|---|
| 8,322,358 B2 * | 12/2012 | Kipp | E03C 1/12 |
| | | | 137/15.08 |
| 9,593,475 B2 * | 3/2017 | Torres | E03C 1/30 |
| 2003/0163869 A1 | 9/2003 | Bosch | |
| 2007/0011808 A1 * | 1/2007 | Park | E03C 1/284 |
| | | | 4/679 |
| 2013/0319564 A1 | 12/2013 | Torres | |
| 2015/0275490 A1 * | 10/2015 | Letcher, Jr. | E03C 1/122 |
| | | | 4/255.01 |

* cited by examiner

PLUMBING P-TRAP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of building including water and sewage supply, more specifically, a plumbing fitting for wastewater with special characteristics for influencing flow characteristics.

SUMMARY OF INVENTION

The improved plumbing P-trap is a plumbing fixture. The improved plumbing P-trap is configured to replace a traditional P-trap. The improved plumbing P-trap is configured for use with a DWV of a plumbing system. The improved plumbing P-trap is configured for use with a sink. The sink is further defined with a drain. The improved plumbing P-trap attaches the drain of a sink to the DWV. The improved plumbing P-trap transports gray water into the DWV from the sink. The improved plumbing P-trap comprises a modified P-trap, a second clean out plug, and a snake guide. The modified P-trap transports gray water from the sink drain to the DWV. The second clean out plug is the modification to the modified P-trap that provides access to the DWV side of the modified P-trap. The second clean out plug is intended for use with a plumbing snake. The snake guide: 1) opens the second clean out plug; and, 2) attaches to the second clean out plug to guide the plumbing snake into the DWV.

These together with additional objects, features and advantages of the improved plumbing P-trap will be readily apparent to those of ordinary skill in the art upon reading the following detailed description of the presently preferred, but nonetheless illustrative, embodiments when taken in conjunction with the accompanying drawings.

In this respect, before explaining the current embodiments of the improved plumbing P-trap in detail, it is to be understood that the improved plumbing P-trap is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the improved plumbing P-trap.

It is therefore important that the claims be regarded as including such equivalent construction insofar as they do not depart from the spirit and scope of the improved plumbing P-trap. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
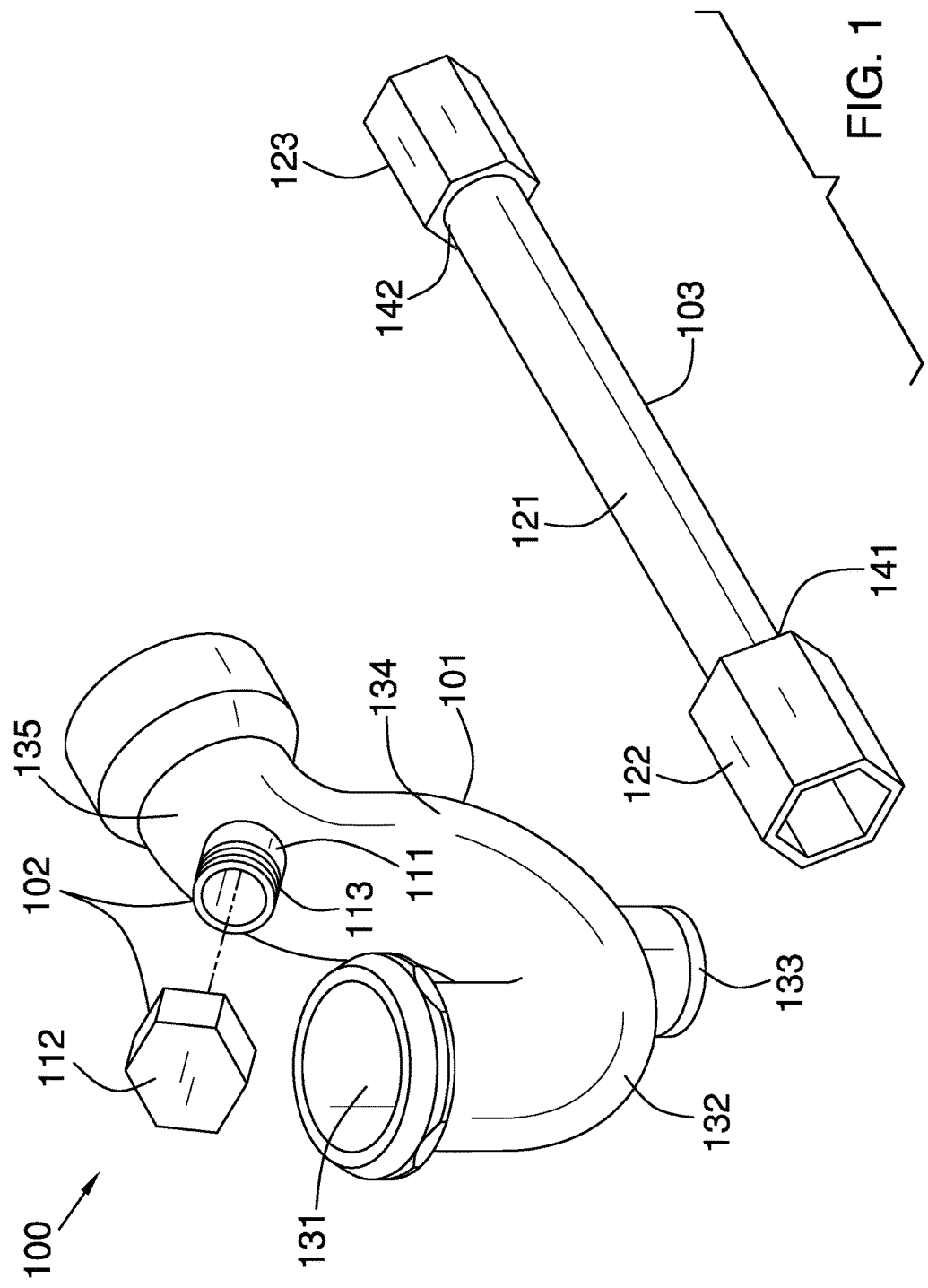
FIG. 1 is a perspective view of an embodiment of the disclosure.
Figure 2:
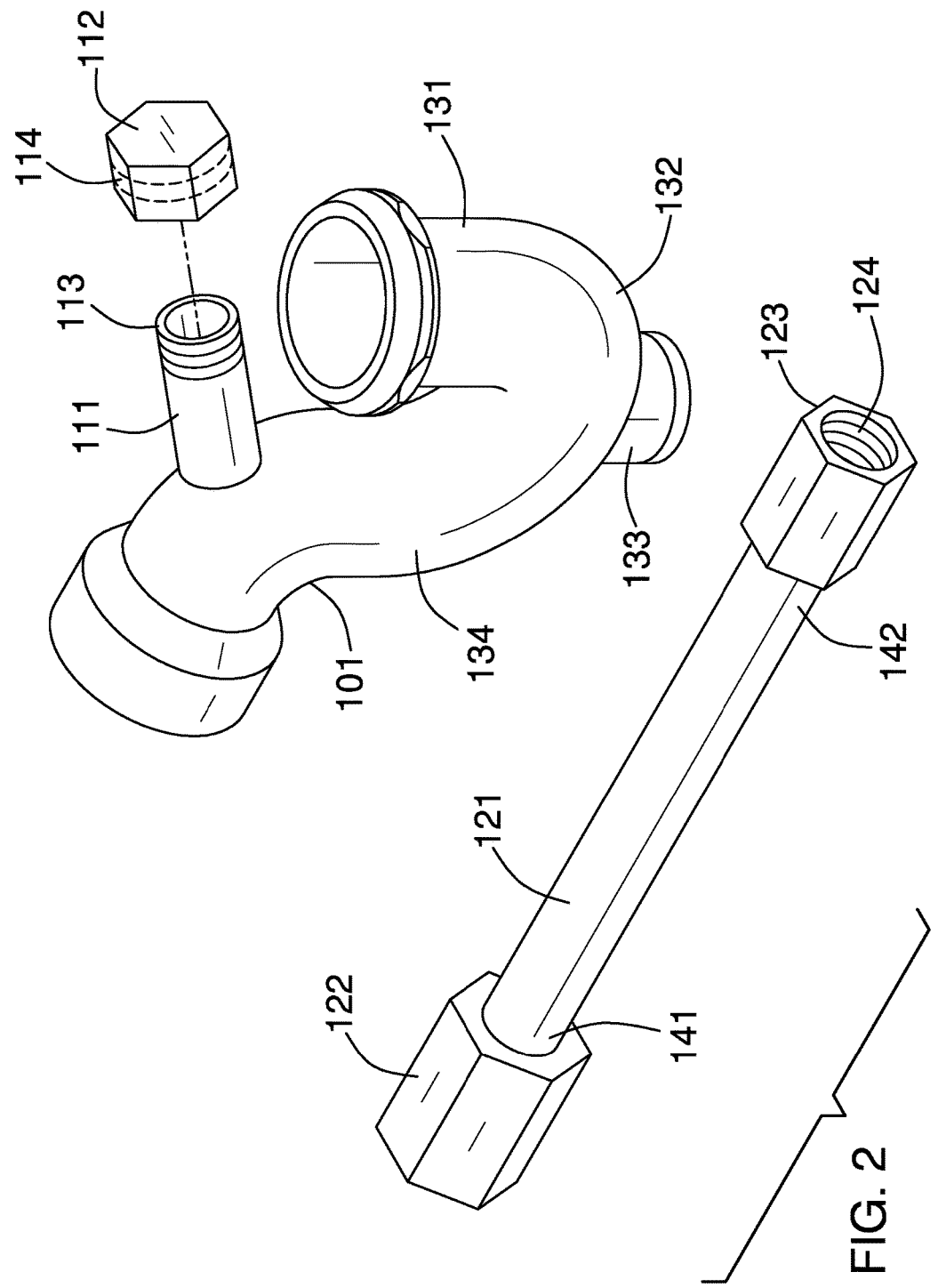
FIG. 2 is a reverse perspective view of an embodiment of the disclosure.
Figure 3:
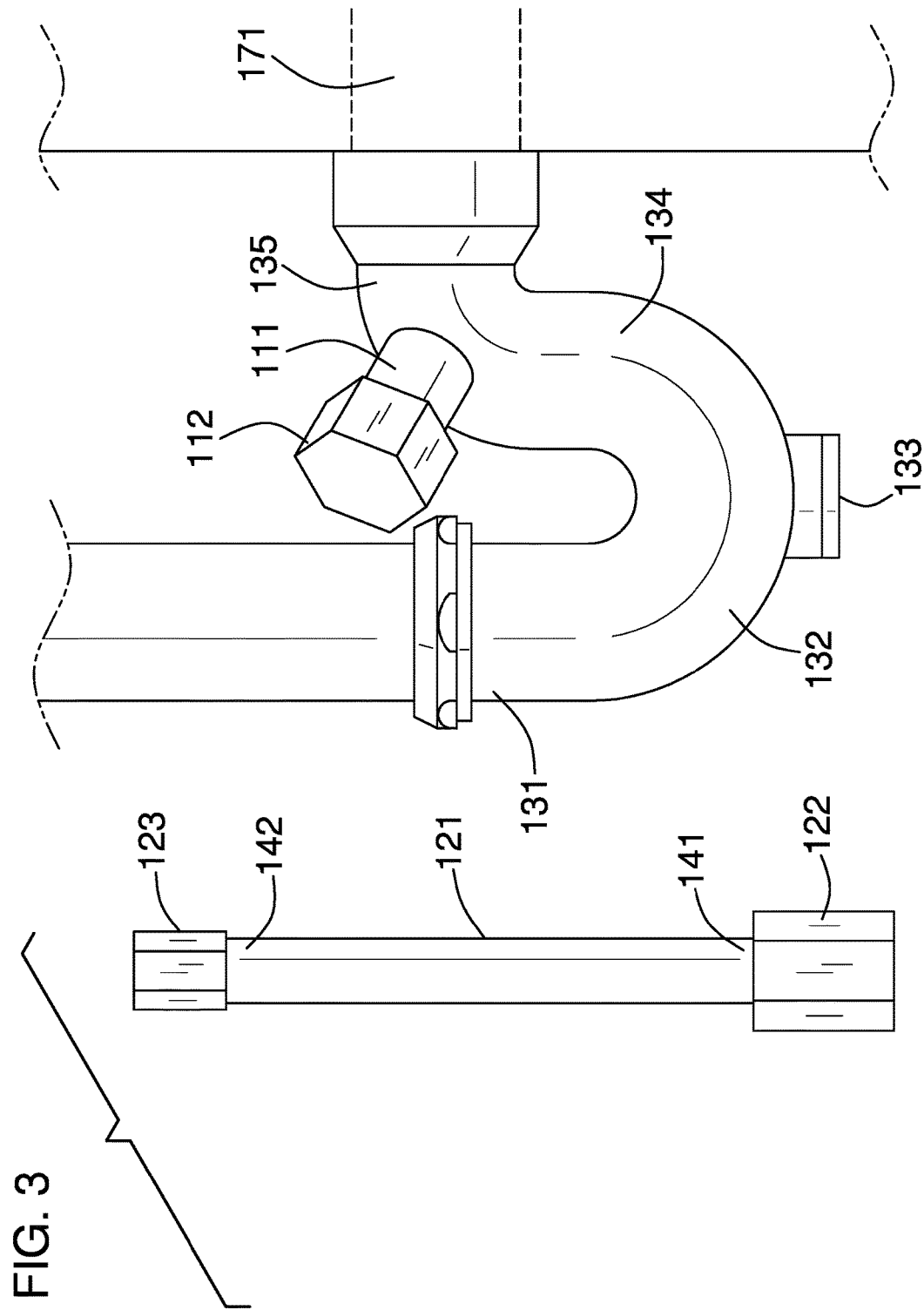
FIG. 3 is a side view of an embodiment of the disclosure.
Figure 4:
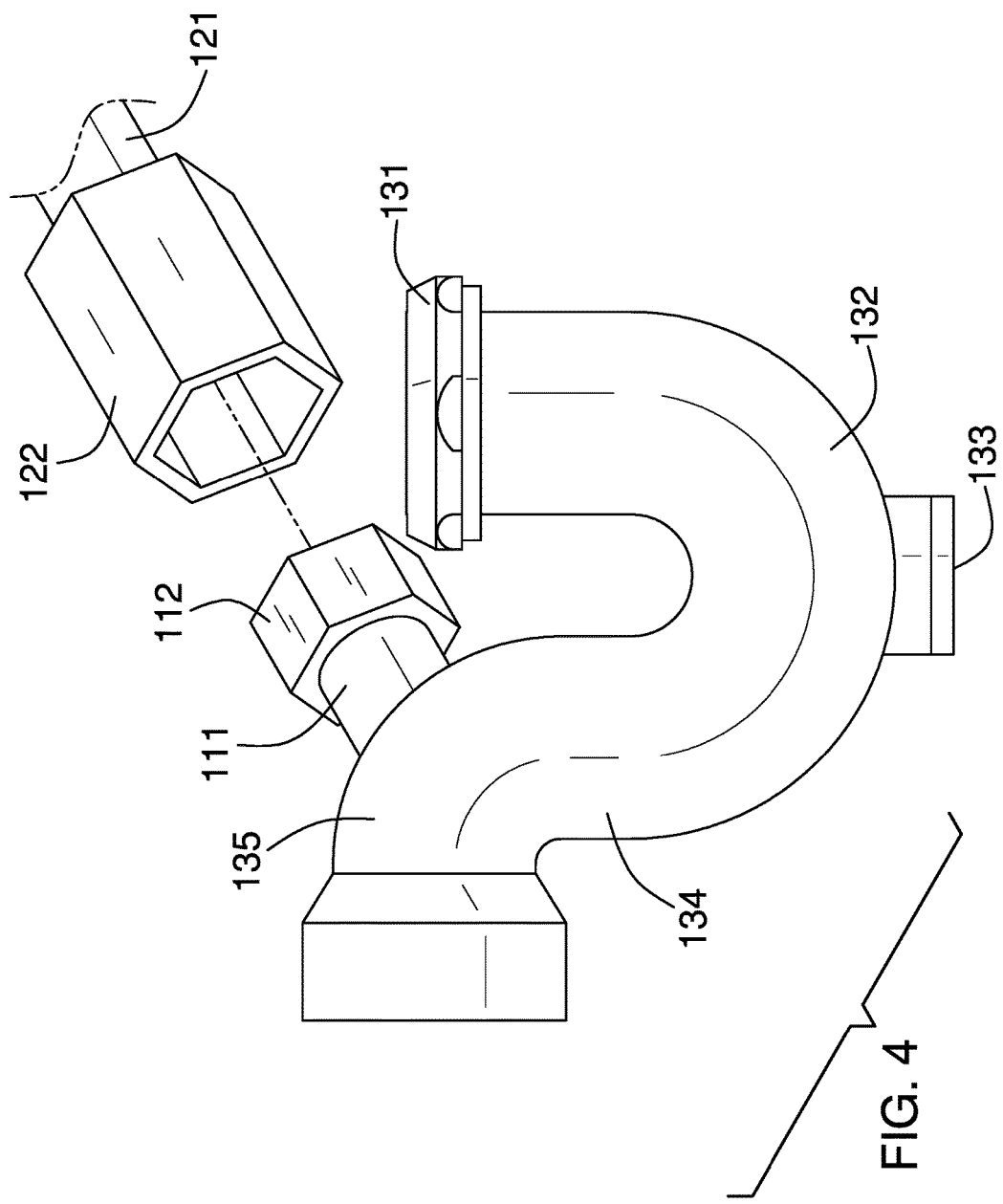
FIG. 4 is a reverse side view of an embodiment of the disclosure.
Figure 5:
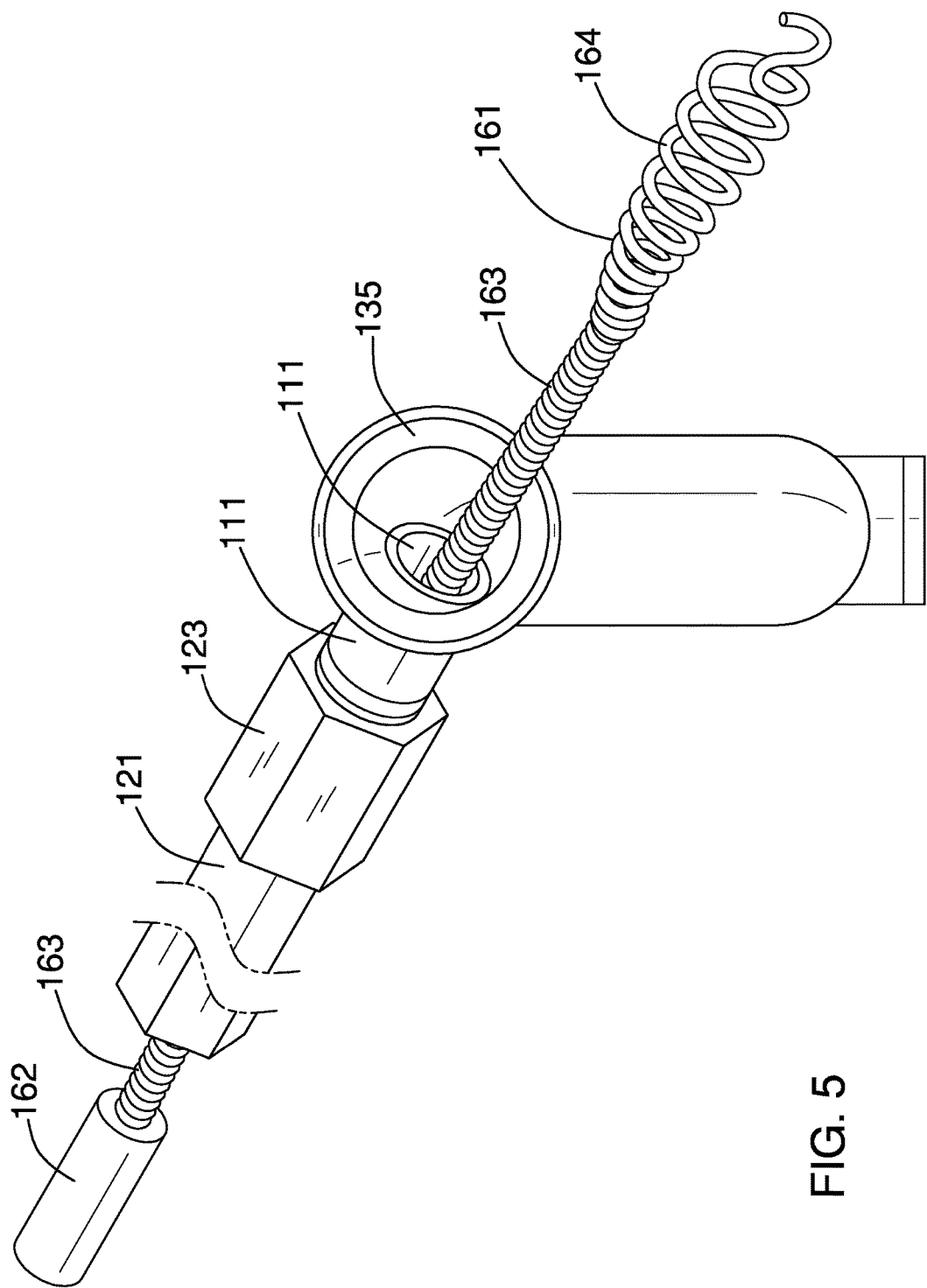
FIG. 5 is an in use view of an embodiment of the disclosure.

Detailed reference will now be made to one or more potential embodiments of the disclosure, which are illustrated in FIGS. 1 through 5.

The improved plumbing P-trap 100 (hereinafter invention) is a plumbing fixture. The invention 100 is configured to replace a traditional P-trap. The invention 100 is configured for use with a DWV 171 (Drain Waste Vent) of a plumbing system. The invention 100 is configured for use with a sink. The sink is further defined with a drain. The invention 100 attaches the drain of a sink to the DWV 171. The invention 100 transports gray water into the DWV 171 from the sink. The DWV 171 is discussed in greater detail elsewhere in this disclosure.

The invention 100 comprises a modified P-trap 101, a second clean out plug 102, and a snake guide 103. The modified P-trap 101 transports gray water from the sink drain to the DWV 171. The second clean out plug 102 is the modification to the modified P-trap 101 that provides access to the DWV 171 side of the modified P-trap 101. The second clean out plug 102 is intended for use with a plumbing snake 161. The snake guide 103: 1) opens the second clean out plug 102; and, 2) attaches to the second clean out plug 102 to guide the plumbing snake 161 into the DWV 171. The plumbing snake 161 is further defined with a drill 162, a rod 163, and a rod tip 164. The plumbing snake 161 is discussed in greater detail elsewhere in this disclosure.

The modified P-trap 101 performs the function of a traditional P-trap. The primary function of the modified P-trap 101 is to form a conduit that transports gray water from the drain of a sink to the DWV 171. Like a traditional P-trap, the modified P-trap 101 forms a seal between the sink and the DWV 171 that prevents gas from passing from the DWV 171 into a domestic space through the sink. The modified P-trap 101 is modified with the second clean out plug 102. The modified P-trap 101 comprises an inlet 131, a dip 132, a first clean out port 133, a seal 134, and an overflow 135.

The dip 132 is a U shaped structure that forms the lowest portion of the modified P-trap 101. The dip 132 forms the gas impermeable seal that isolates the DWV 171 from the domestic space. The seal of the dip 132 is formed by the accumulation of water within the dip 132. The use of a P-trap for this purpose is well-known and documented in the plumbing arts. The first clean out port 133 is a clean out plug that provides access into the dip 132 for the purpose of removing debris that accumulates in the first clean out port 133.

The inlet 131 connects the modified P-trap 101 to the drain of the sink. The seal 134 is the portion of the dip 132 that runs from the first clean out port 133 to the overflow 135. The purpose of the seal 134 is to provide enough of a vertical head to ensure that adequate water accumulates in the dip 132 to create the gas impermeable seal. The overflow 135 is the pipe and the connecting fitting that attaches the modified P-trap 101 to the DWV 171.

The second clean out plug 102 is a clean out plug that provides access for a plumbing snake 161 to be inserted into the DWV 171 for maintenance purposes. The second clean out plug 102 is a capped aperture that provides access into the DWV 171 through the overflow 135 of the modified P-trap 101. By placing the second clean out plug 102 in the overflow 135 of the modified P-trap 101 the rod 163 of the plumbing snake 161 can be inserted directly into the DWV 171 without having to negotiate the dip 132 and the seal 134 of the modified P-trap 101. The second clean out plug 102 further eliminates having to remove the modified P-trap 101 before using the plumbing snake 161 on the DWV 171. The second clean out plug 102 comprises a guide pipe 111 and a cap 112.

The guide pipe 111 is a readily and commercially available pipe. The guide pipe 111 attaches to the overflow 135 of the modified P-trap 101 in the manner of a cantilever. The guide pipe 111 provides an opening into the overflow 135 of the modified P-trap 101 such that items inserted into the free end of the guide pipe 111 can enter the overflow 135. The guide pipe 111 further comprises an exterior screw thread 113. The exterior screw thread 113 is an exterior screw thread formed on the free end of the guide pipe 111. Threaded connections, exterior screw threads, and interior screw threads are discussed in greater detail elsewhere in this disclosure.

The cap 112 is a cover that closes off the guide pipe 111 when access to the DWV 171 is not required. The cap 112 is a capped pipe formed in the shape of a hexagonal disk. The inner diameter of the cap 112 is greater than the outer diameter of the guide pipe 111 such that the cap 112 will fit over the guide pipe 111. The cap 112 attaches to the guide pipe 111 using a threaded connection. The cap 112 further comprises a first interior screw thread 114. The first interior screw thread 114 is an interior screw thread formed on the inner surface of the open end of the cap 112. The first interior screw thread 114 matches with the exterior screw thread 113 such that the cap 112 can be screwed on to the guide pipe 111 to form a threaded connection.

The snake guide 103 is a dual purpose tool. The snake guide 103 opens and closes the second clean out plug 102 to provide access into the DWV 171. The snake guide 103 further attaches to the second clean out plug 102. Attaching the snake guide 103 to the second clean out plug 102 allows the rod 163 of the plumbing snake 161 to be inserted through the guide pipe 111 into the DWV 171. The use of the snake guide 103 allows for better control of the plumbing snake 161 and prevents the rod 163 of the plumbing snake 161 from whipping out in an uncontrolled manner during use of the plumbing snake 161. The snake guide 103 comprises a snake pipe 121, a hex socket 122, and a guide fitting 123. The snake pipe 121 is further defined with a first end 141 and a second end 142.

The snake pipe 121 is a readily and commercially available pipe. The hex socket 122 and the guide fitting 123 are attached to the snake pipe 121. The inner diameter of the snake pipe 121 is sized such that the rod 163 and the rod tip 164 of the plumbing snake 161 insert into the snake pipe 121. The snake pipe 121 is an extension structure that moves the access into the DWV 171 to a more convenient location.

The hex socket 122 is a well-known and documented device attaches to the first end 141 of the snake pipe 121. The hex socket 122 is sized to fit over the cap 112 such that the hex socket 122 can be used to screw and unscrew the cap 112 on to and off of the guide pipe 111. The hex socket 122 is a hollow device that is sized such that the rod 163 and the rod tip 164 of the plumbing snake 161 insert through the hex socket 122 into the snake pipe 121. The hex socket 122 is a commercially available device that is discussed in greater detail elsewhere in this disclosure.

The guide fitting 123 is hollow cylindrical fitting that forms a threaded connection with the free end 111 of the guide pipe 111. The guide fitting 123 further comprises a second interior screw thread 124. The interior surface of the guide fitting 123 is formed with the second interior screw thread 124. The second interior screw thread 124 matches the first interior screw thread 114 such that the guide fitting 123 can be screwed on to the exterior screw thread 113 of the guide pipe 111 to form a threaded connection. The guide fitting 123 is sized such that the rod 163 and the rod tip 164 of the plumbing snake 161 insert through the guide fitting 123 into the overflow 135 of the modified P-trap 101.

The following definitions were used in this disclosure:

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Capped Pipe: As used in this disclosure, a capped pipe is a pipe with one closed end and one open end.

Clean out Plug: As used in this disclosure, a clean out plug is a port that provides access into the pipes of the drains of a plumbing system for the purpose of removing blockages within the plumbing system.

Diameter: As used in this disclosure, a diameter of an object is a straight line segment (or a radial line) that passes through the center (or center axis) of an object. The line segment of the diameter terminates at the perimeter or boundary of the object through which the line segment of the diameter runs.

Disk: As used in this disclosure, a disk is a cylindrically shaped object that is flat in appearance.

DWV: As used in this disclosure, DWV is an acronym for drainage, waste, and vent. With a residential plumbing system, DWV refers to the plumbing subnetwork that transports waste water out of the residence to an appropriate waste water handling system.

Extension Structure: As used in this disclosure, an extension structure is an inert physical structure that is used to extend the span of the distance between any two objects.

Exterior Screw Thread: An exterior screw thread is a ridge wrapped around the outer surface of a tube in the form of a helical structure that is used to convert rotational movement into linear movement.

Gray Water: As used in this disclosure, gray water is the water introduced into the DWV of a domestic plumbing system. This definition is intended to include what is often referred to as black water.

Hex Socket: As used in this disclosure, a hex socket is a cylindrical pipe that is designed to receive the head of a hexagonal fastening device such as a bolt or a nut. The hex socket fits over and secures the hexagonal fastening device such that the hex socket can rotate the hexagonal fastening device to create or disconnect a threaded connection. Hexagonal fastening devices are also referred to as six point fasteners.

Inner Diameter: As used in this disclosure, the term inner diameter is used in the same way that a plumber would refer to the inner diameter of a pipe.

Interior Screw Thread: An interior screw thread is a groove that is formed around the inner surface of a tube in the form of a helical structure that is used to convert rotational movement into linear movement.

Outer Diameter: As used in this disclosure, the term outer diameter is used in the same way that a plumber would refer to the outer diameter of a pipe.

Pipe: As used in this disclosure, a pipe is a hollow cylindrical device used for transporting liquids and gases. The line that connects the center of the first base of the cylinder to the center of the second base of the cylinder is referred to as the axis of the cylinder or the centerline of the pipe. When two pipes share the same center line they are said to be aligned. In this disclosure, the terms inner diameter of a pipe and outer diameter are used as they would be used by those skilled in the plumbing arts.

Plumbing Snake: As used in this disclosure, a plumbing snake is a flexible metal cable that rotates within a drain pipe for the purpose of clearing any blockages within the drain pipe. A plumbing snake comprises a drill, a rod, and a rod tip. The metal cable is called the rod. The rod attaches to the drill in the manner of a cantilever such that the drill can rotate the rod. The rod tip is an optional blade configuration that is attached to the free end of the rod. Port: As used in this disclosure, a port is an opening formed in an object that allows fluid to flow through the boundary of the object.

P-trap: As used in this disclosure, a P-trap is a plumbing fitting that is typically found under sinks in a domestic environment. The P-trap: 1) captures debris that falls into the drain of a sink; and, 2) forms a gas impermeable seal that prevents the transfer of gas from the DWV into the domestic space serviced by the sink. A P-trap is further defined with an inlet, a dip, an optional clean out plug, a seal, and an overflow.

Radial: As used in this disclosure, the term radial refers to a direction that: 1) is perpendicular to an identified central axis; or, 2) projects away from a center point.

Screw: When used as a verb in this disclosure, to screw means: 1) to fasten or unfasten (unscrew) a threaded connection; or 2) to attach a helical structure to a solid structure.

Sink: As used in this disclosure, a sink is a permanently installed water basin that is attached to one or more water sources.

Socket: As used in this disclosure, a socket is an opening or cavity that is configured to receive an inserted component.

Threaded Connection: As used in this disclosure, a threaded connection is a type of fastener that is used to join a first tube shaped and a second tube shaped object together. The first tube shaped object is fitted with a first fitting selected from an interior screw thread or an exterior screw thread. The second tube shaped object is fitted with the remaining screw thread. The tube shaped object fitted with the exterior screw thread is placed into the remaining tube shaped object such that: 1) the interior screw thread and the exterior screw thread interconnect; and, 2) when the tube shaped object fitted with the exterior screw thread is rotated the rotational motion is converted into linear motion that moves the tube shaped object fitted with the exterior screw thread either into or out of the remaining tube shaped object. The direction of linear motion is determined by the direction of rotation.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A plumbing fitting comprising:
a modified P-trap, a clean out plug, and a snake guide;
wherein the clean out plug is formed in the modified P-trap;
wherein the snake guide accesses the modified P-trap through the second clean out;
wherein the plumbing fitting is configured for use with a DWV of a plumbing system;
wherein the plumbing fitting is configured for use with a sink;
wherein the sink is further defined with a drain;
wherein the plumbing fitting attaches the drain of a sink to the DWV;
wherein the plumbing fitting transports gray water into the DWV from the sink;
wherein the clean out plug accesses the DWV side of the modified P-trap;
wherein the clean out plug is configured for use with a plumbing snake;
wherein the plumbing snake is further defined with a drill and a rod;

wherein the snake guide opens the clean out plug;
wherein the snake guide attaches to the clean out plug;
wherein the snake guide guides the rod of the plumbing snake into the DWV;
wherein the modified P-trap comprises an inlet, a dip, a first clean out port, a seal and an overflow;
wherein the inlet, the seal, and the first clean out port attach to the dip;
wherein the dip attaches to the seal;
wherein the dip is a U shaped structure;
wherein the dip forms the lowest portion of the modified P-trap;
wherein the dip forms a gas impermeable seal that isolates the DWV from a domestic space;
wherein the inlet connects the modified P-trap to the drain of the sink;
wherein the overflow attaches the modified P-trap to the DWV;
wherein the clean out plug is an aperture that provides access into the DWV through the overflow of the modified P-trap;
wherein the clean out plug comprises a guide pipe and a cap;
wherein the guide pipe is pipe;
wherein the cap is a capped pipe;
wherein the cap attaches to the guide pipe;
wherein the cap is further defined with an open end;
wherein the guide pipe attaches to the overflow of the modified P-trap in the manner of a cantilever;
wherein the guide pipe is further defined with a free end;
wherein the guide pipe further comprises an exterior screw thread;
wherein the exterior screw thread is formed on the free end of the guide pipe;
wherein the cap is a cover that closes off the guide pipe;
wherein the cap is formed in the shape of a hexagonal disk;
wherein the inner diameter of the cap is greater than the outer diameter of the guide pipe;
wherein the cap attaches to the guide pipe using a threaded connection;
wherein the cap further comprises a first interior screw thread;
wherein the first interior screw thread is formed on the inner surface of the open end of the cap;
wherein the first interior screw thread matches with the exterior screw thread such that the cap can be screwed on to the guide pipe to form a threaded connection;
wherein the snake guide opens and closes the clean out plug to provide access into the DWV;
wherein the snake guide comprises a snake pipe, a hex socket, and a guide fitting;
wherein the hex socket and the guide fitting are attached to the snake pipe;
wherein the snake pipe is further defined with a first end and a second end.

2. The plumbing fitting according to claim 1
wherein the snake pipe is a pipe;
wherein the inner diameter of the snake pipe is sized such that the rod of the plumbing snake inserts into the snake pipe.

3. The plumbing fitting according to claim 2
wherein the hex socket is a hollow device;
wherein the hex socket is sized to fit over the cap such that the hex socket can be used to screw and unscrew the cap on to and off of the guide pipe;
wherein the hex socket attaches to the first end of the snake pipe.

4. The plumbing fitting according to claim 3 wherein the hex socket is sized such that the rod of the plumbing snake inserts through the hex socket into the snake pipe.

5. The plumbing fitting according to claim 4
wherein the guide fitting is hollow cylindrical fitting;
wherein the guide fitting forms a threaded connection with the second end of the snake pipe.

6. The plumbing fitting according to claim 5
wherein the guide fitting further comprises a second interior screw thread;
wherein the interior surface of the guide fitting is formed with the second interior screw thread.

7. The plumbing fitting according to claim 6 wherein the second interior screw thread matches the first interior screw thread such that the guide fitting can be screwed on to the exterior screw thread of the guide pipe to form a threaded connection.

8. The plumbing fitting according to claim 7 wherein the guide fitting is sized such that the rod of the plumbing snake insert through the guide fitting into the overflow of the modified P-trap.

\* \* \* \* \*